(12) United States Patent
Kurata et al.

(10) Patent No.: US 8,928,182 B2
(45) Date of Patent: Jan. 6, 2015

(54) WIRELESS POWER FEEDER AND WIRELESS POWER TRANSMISSION SYSTEM

(75) Inventors: Hitoyoshi Kurata, Tokyo (JP); Masami Itakura, Tokyo (JP)

(73) Assignee: TDK Corporation, Tokyo (JP)

( * ) Notice: Subject to any disclaimer, the term of this patent is extended or adjusted under 35 U.S.C. 154(b) by 584 days.

(21) Appl. No.: 13/328,590

(22) Filed: Dec. 16, 2011

(65) Prior Publication Data

US 2013/0154382 A1 Jun. 20, 2013

(51) Int. Cl.
- H01F 27/42 (2006.01)
- H01F 37/00 (2006.01)
- H01F 38/00 (2006.01)

(52) U.S. Cl.
USPC ........................................ 307/104

(58) Field of Classification Search
CPC ........... H02J 17/00; H02J 7/025; H02J 5/005; H02J 5/00; H02J 7/0052; H02J 7/007; H03H 7/40
USPC ........................................ 307/104
See application file for complete search history.

(56) References Cited

U.S. PATENT DOCUMENTS

| 8,008,888 | B2 | 8/2011 | Oyobe et al. |
| 2010/0123430 | A1 | 5/2010 | Kojima et al. |
| 2010/0225271 | A1 | 9/2010 | Oyobe et al. |
| 2010/0244577 | A1 | 9/2010 | Shimokawa |
| 2010/0244581 | A1 | 9/2010 | Uchida |
| 2011/0115303 | A1* | 5/2011 | Baarman et al. .............. 307/104 |
| 2011/0121778 | A1 | 5/2011 | Oyobe et al. |
| 2011/0316348 | A1 | 12/2011 | Kai et al. |
| 2012/0032525 | A1 | 2/2012 | Oyobe et al. |

FOREIGN PATENT DOCUMENTS

| JP | A-2009-106136 | 5/2009 |
| JP | A-2010-22076 | 1/2010 |
| JP | A-2010-51137 | 3/2010 |
| JP | A-2010-119251 | 5/2010 |
| JP | A-2010-233442 | 10/2010 |
| JP | A-2010-239690 | 10/2010 |
| JP | A-2010-239816 | 10/2010 |

\* cited by examiner

*Primary Examiner* — Carlos Amaya
(74) *Attorney, Agent, or Firm* — Oliff PLC

(57) ABSTRACT

A wireless power feeder has a power feed coil that performs a power feed by a non-contact method to a wireless power receiver having a power receive coil. A power source section supplies AC power to the power feed coil. A control section calculates a power transmission efficiency from the power feed coil to the power receive coil to control a power source section so that the power supply to the power feed coil is in a stopped or intermittent state when the power transmission efficiency is lower than a first determination reference value; is in a first power supply state when the power transmission efficiency is equal to or higher than the first determination reference value and lower than a larger second determination reference value; and is in a second power supply state when the power transmission efficiency is equal to or higher than the second determination reference value.

18 Claims, 15 Drawing Sheets

WIRELESS POWER FEEDER AND WIRELESS POWER TRANSMISSION SYSTEM

BACKGROUND OF THE INVENTION

1. Field of the Invention

The present invention relates to a wireless power feeder and a wireless power transmission system for transmitting power by a non-contact method.

2. Related Background Art

Japanese Patent Application Publication No. 2010-22076 discloses a wireless power transmission system (contactless power transmission device) which transmits power by a non-contact method from a power feed coil (primary coil) to a power receive coil (secondary coil) utilizing an electromagnetic induction effect which is a kind of magnetic coupling (electromagnetic coupling).

In this kind of wireless power transmission system, the coupling state between the power feed coil and the power receive coil changes (e.g., mutual inductance of these coils varies) and power transmission efficiency declines due to variation of the inductance of the power feed coil and the power receive coil, change of the relative distance between the power feed coil and the power receive coil, a positional deviation of the power feed coil or the power receive coil, intrusion of foreign material between the power feed coil and the power receive coil, or the like.

In respect of this point, Japanese Patent Application Publication No. 2010-22076 describes that a means for supplying AC power or current to the power feed coil and a means for detecting the power or current supplied to the power feed coil are provided and the frequency of the AC power or current is controlled so as to maximize the power or current to be supplied to the power feed coil. By this means, decline in the power transmission efficiency can be avoided and the transmission efficiency can be improved.

Meanwhile, Japanese Patent Application Publication No. 2010-239816 discloses a wireless power transmission system which transmits power by a non-contact (wireless) method from a wireless power feeder to a wireless power receiver utilizing a magnetic field resonance effect which is a kind of magnetic coupling (electromagnetic coupling). In this wireless power transmission system, a wireless power feeder is provided with a power feed resonance circuit including a power feed coil and stray capacitance and a wireless power receiver is also provided with a power receive resonance circuit including a power receive coil and stray capacitance.

Also in this kind of wireless power transmission system, the coupling state between the power feed resonance circuit and the power receive resonance circuit changes (e.g., resonance frequencies of these resonance circuits shift or mutual inductance between these coils varies) and power transmission efficiency declines due to variation in a quality of components constituting each of the power feed resonance circuit and the power receive resonance circuit, change of the relative distance between the power feed coil and the power receive coil, a positional deviation of the power feed coil or the power receive coil, intrusion of foreign material between the power feed coil and the power receive coil, or the like.

In this regard, also in a wireless power transmission system disclosed in Japanese Patent Application Publication No. 2010-239816, it is expected to be able to avoid the decline of the power transmission efficiency and to improve the transmission efficiency by controlling the frequency of AC power or current to be supplied to the power feed coil in the power feed resonance circuit.

Incidentally, when power transmission is being continued in a case in which the power transmission efficiency declines due to the variation in quality of components constituting each of the power feed resonance circuit and the power receive resonance circuit, due to the change of the relative distance between the power feed coil and the power receive coil, due to the positional deviation of the power feed coil or the power receive coil, due to the intrusion of foreign material between the power feed coil and the power receive coil, or the like, there is a risk that loss in the transmitting and receiving system and unnecessary radiation increase and some sort of failure occurs due to these hazardous factors.

In this regard, Japanese Patent Application Publication No. 2010-239816 describes that a frequency profile when the frequency of the AC power or current to be supplied to the power feed coil in the power feed resonance circuit is changed in a predetermined range, that is, a frequency profile showing a frequency dependence of a power transmission state is obtained, and then the obtained frequency profile is compared with a preliminarily measured normal frequency profile, and power transmission should be stopped if the obtained frequency profile does not match the normal frequency profile. By this means, occurrence of the failure due to the decline of the power transmission efficiency can be avoided.

SUMMARY OF THE INVENTION

Incidentally, in this kind of wireless power transmission system, if inherent loss in the wireless power transmission system is small and unnecessary radiation meets the legal standard even when the power transmission efficiency declines, it is possible to continue power transmission. However, in the wireless power transmission system disclosed in Japanese Patent Application Publication No. 2010-239816, all the cases in which the obtained frequency profile does not match the normal frequency profile are determined to be hazardous and the power transmission is stopped (low robustness controllability).

Accordingly, the present invention aims at providing a wireless power feeder and a wireless power transmission system which can continue power transmission even when the power transmission efficiency declines while avoiding the occurrence of the failure due to the decline of the power transmission efficiency (improve robustness controllability).

A wireless power feeder of the present invention is a wireless power feeder that performs power feed by a non-contact method to a wireless power receiver which has a power receive coil, and the wireless power feeder is provided with a power feed coil to perform power feed from the power feed coil to the power receive coil on the basis of a magnetic coupling between the power feed coil and the power receive coil, a power source section supplying AC power to the power feed coil, and a control section calculating a power transmission efficiency from the power feed coil to the power receive coil to control the power source section according to the power transmission efficiency, wherein the control section controls the power source section so that the power supply to the power feed coil is in a stopped state or in an intermittent supply state when the power transmission efficiency is lower than a first determination reference value, controls the power source section so that the power supply to the power feed coil is in a first power supply state when the power transmission efficiency is equal to or higher than the first determination reference value and lower than a second determination reference value, the second determination reference value being larger than the first determination reference value, and controls the power source section so that the power supply to the power feed coil is in a second power supply state when the power transmission efficiency is equal to or higher than the second determination reference value.

According to this wireless power feeder, the control section brings the power supply to the power feed coil into the stopped state or the intermittent supply state when the power transmission efficiency is lower than the first determination reference value and thereby it is possible to avoid the occurrence of the failure due to the decline of the power transmission efficiency.

Further, according to this wireless power feeder, the power transmission is enabled when the power transmission efficiency is equal to or higher than the first determination reference value, and also, when the power transmission efficiency is lower than the second determination reference value, the power supply is brought into the first power supply state which is different from the second power supply state when the power transmission efficiency is equal to or higher than the second determination reference value. For example, supply power to the power feed coil is made smaller in the first power supply state, in which the possibility of the failure occurrence is low although the power transmission state is not preferable, than in the second power supply state in which the power transmission state is preferable. Thereby, it is possible to continue power transmission while suppressing the inherent loss in the wireless power transmission system and the unnecessary radiation even when the power transmission efficiency declines (to improve the robustness controllability).

Further, in the wireless power transmission system disclosed in Japanese Patent Application Publication No. 2010-239816, it is necessary to obtain the normal frequency profile for each product because of the variation in a quality of components, for example, and there is a possibility of cost up. However, according to the wireless power feeder of the present invention, it is not necessary to set the determination reference for each product.

Further, in the wireless power transmission system disclosed in Japanese Patent Application Publication No. 2010-239816, it is necessary to sweep the frequency in a predetermined frequency range when obtaining the frequency profile and it takes time to perform the determination. However, according to the wireless power feeder of the present invention, it is possible to perform the determination in a comparatively short time.

In the above described wireless power feeder, AC power to be supplied to the power feed coil in the first power supply state is smaller than AC power to be supplied to the power feed coil in the second power supply state. Thereby, it is possible to continue power transmission while suppressing the inherent loss in the wireless power transmission system and the unnecessary radiation even when the power transmission efficiency declines (to improve the robustness controllability).

The above described control section controls the power source section so as not to start the power supply to the power feed coil even when the power transmission efficiency increases to the first determination reference value or more and so as to start the power supply to the power feed coil when the power transmission efficiency increases to the second determination reference value or more, and controls the power source section so as not to stop the power supply to the power feed coil even when the power transmission efficiency declines to less than the second determination reference value and so as to stop the power supply to the power feed coil when the power transmission efficiency declines to less than the first determination reference value. By this hysteresis operation characteristic, it is possible to prevent ON-OFF chattering in power transmission operation.

Further, the above described control section adjusts the power transmission efficiency by changing the frequency of AC power to be supplied to the power feed coil. Thereby, it is possible to suppress the decline of the power transmission efficiency.

Further, the above described control section adjusts the power transmission efficiency by changing the impedance of the power feed coil. Thereby, it is possible to suppress the decline of the power transmission efficiency.

Further, the above described control section controls the power source section so that a frequency variable range of AC power to be supplied to the power feed coil in the second power supply state is narrower than the frequency variable range of AC power to be supplied to the power feed coil in the first power supply state. Thereby, it is possible to shorten the control operation time in the second power supply state with respect to the control operation time in the first power supply state.

Further, the above described control section controls the power source section so that an impedance variable range of the power feed coil in the second power supply state is narrower than the impedance variable range of the power feed coil in the first power supply state. Thereby, it is possible to shorten the control operation time in the second power supply state with respect to the control operation time in the first power supply state.

The above described wireless power feeder further has a notification section notifying discriminably that the power supply to the power feed coil is in the stopped state or intermittent supply state, in the first power supply state, or in the second power supply state. To the notification section, it is possible to apply a display device such as an LED and a display panel, an alarming device such as a speaker, or the like, for example. Thereby, a user can recognize the power transmission state and can perform positional adjustment between the wireless power feeder and the wireless power receiver, removal of the foreign material between the wireless power feeder and the wireless power receiver, and the like, for example.

Further, in the above described wireless power feeder, the second determination reference value can be changed. Thereby, a user optionally can change the setting of the second determination reference value except the first determination reference value for avoiding the failure occurrence, and it is possible to realize user friendliness.

Further, in the above described wireless power feeder, the first determination reference value can be changed according to AC power to be supplied to the power feed coil. For example, in low power transmission operation, also the first determination reference value for avoiding failure occurrence can be set to a smaller value. According to the wireless power feeder of the present invention, it is possible to set the first determination reference value to a smaller value in the low power transmission operation and, as a result, it is possible to extend a transmission distance.

Further, the above described control section calculates a ratio between input power of the power source section and AC power supplied to the power feed coil or a ratio between input current of the power source section and AC current supplied to the power feed coil as a power transmission efficiency from the power feed coil to the power receive coil. This is based on that the ratio between the input power of the power source section and the input power of the power feed coil varies depending on the power transmission efficiency from the power feed coil to the power receive coil.

A further wireless power feeder according to the present invention is a wireless power feeder which performs power feed by a non-contact method to a wireless power receiver having a power receive resonance circuit including a power receive coil and a power receive capacitor, the wireless power feeder further having: a power feed resonance circuit, including the power feed coil and a power feed capacitor and performing power feed from the power feed coil to the power receive coil on the basis of a magnetic field resonance effect between the power feed coil and the power receive coil.

Here, the "magnetic field resonance effect between the power feed coil and the power receive coil" means a resonance effect of the power receive resonance circuit based on an AC magnetic field which is produced by the power feed coil. This magnetic field resonance effect is also one type of magnetic coupling (electromagnetic coupling). When an AC current is supplied to the power feed coil, an AC magnetic field is produced by the power feed coil. By this means, the power feed coil and the power receive coil are magnetically coupled, and the power receive resonance circuit resonates.

The above described control section adjusts the power transmission efficiency by changing the impedance of the power feed resonance circuit. Thereby, it is possible to suppress the decline of the power transmission efficiency.

Further, the above described control section controls the power source section so that an impedance variable range of the power feed resonance circuit in the second power supply state is narrower than the impedance variable range of the power feed resonance circuit in the first power supply state. Thereby, it is possible to shorten the control operation time in the second power supply state with respect to the control operation time in the first power supply state.

Yet a further wireless power feeder according to the present invention is a wireless power feeder which performs power feed by a non-contact method to a wireless power receiver having a power receive resonance circuit including a power receive coil and a power receive capacitor, wherein, in the wireless power feeder, the power feed coil does not substantially constitute a resonance circuit, and performs power feed from the power feed coil to the power receive coil on the basis of a magnetic field resonance effect between the power feed coil and the power receive coil.

Here, "does not substantially constitute a resonance circuit" means that the power feed coil does not form a resonance circuit of which the resonance frequency is the resonance frequency of the power receive resonance circuit, but does not exclude the fact that the power feed coil may resonate incidentally with any of the circuit elements. For example, "does not substantially constitute a resonance circuit" means that a capacitor is not provided in series or in parallel with the power feed coil, in order to form a resonance circuit having a resonance frequency which is the resonance frequency of the power receive resonance circuit.

Incidentally, the present inventors have found that there are two frequencies where the power factor of transmission power becomes one in a system provided with two resonance circuits of a power feed resonance circuit and a power receive resonance circuit, and these frequencies vary when the distance between the resonance coils changes only slightly. Accordingly, in the wireless power transmission system disclosed in Japanese Patent Application Publication No. 2010-239816, it is expected that the frequency profile varies when the distance between the resonance coils changes only slightly and power transmission is stopped also in a state having a low possibility of the failure occurrence (low robustness controllability). However, according to the wireless power feeder of the present invention, power transmission is not stopped unnecessarily due to the distance variation between the resonance coils (high robustness controllability).

A wireless power transmission system of the present invention is a wireless power transmission system which transmits power by a non-contact method between the above described wireless power feeder and a wireless power receiver having a power receive coil, and the wireless transmission system performs power transmission from the power feed coil in the wireless power feeder to the power receive coil in the wireless power receiver on the basis of a magnetic coupling between the power feed coil and the power receive coil.

A wireless power transmission system of the present invention is a wireless power transmission system which transmits power by a non-contact method between the above described further wireless power feeder and a wireless power receiver having a power receive resonance circuit which includes a power receive coil and a power receive capacitor, and the wireless transmission system performs power transmission from the power feed coil in the wireless power feeder to the power receive coil in the wireless power receiver on the basis of a magnetic field resonance effect between the power feed coil and the power receive coil.

According to this wireless power transmission system, since the above described wireless power feeder is included, it is possible to avoid the failure occurrence due to the decline of the power transmission efficiency and also to continue power transmission while suppressing the inherent loss in the wireless power transmission system and the unnecessary radiation even when the power transmission efficiency declines (to improve the robustness controllability).

According to the present invention, it is possible to continue power transmission while avoiding the failure occurrence due to the decline of the power transmission efficiency even when the power transmission efficiency declines (to improve the robustness controllability).

DESCRIPTION OF THE PREFERRED EMBODIMENTS

Figure 1:
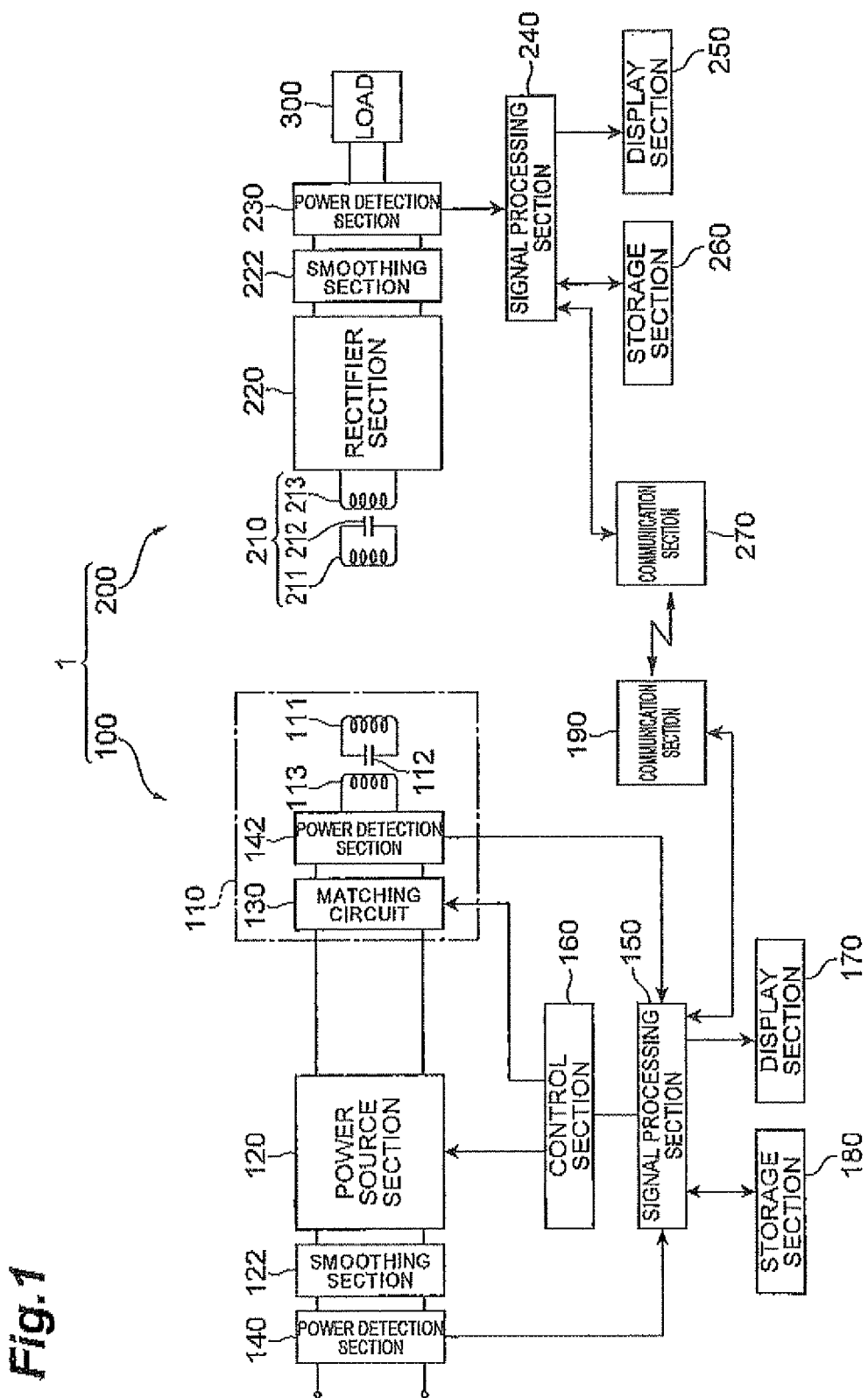
FIG. 1 is a circuit block diagram showing a configuration example of a wireless power transmission system and a wireless power feeder in an embodiment of the present invention.

Hereinafter, preferable embodiments of the present invention will be explained with reference to the drawings. Note that the same or equivalent part will be denoted by the same reference numeral in each of the drawings.

FIG. 1 is a circuit block diagram showing a configuration example of a wireless power transmission system in an embodiment of the present invention. This wireless power transmission system 1 is provided with a wireless power feeder 100 and a wireless power receiver 200 and transmits power by a non-contact method from the wireless power feeder 100 to the wireless power receiver 200.

The wireless power feeder 100 has a power feed resonance circuit 110 including a power feed coil 111 and a power feed capacitor 112. On the other side, the wireless power receiver 200 has a power receive resonance circuit 210 including a power receive coil 211 and a power receive capacitor 212. In the present embodiment, the power feed resonance circuit 110 has an excitation coil 113 which is electromagnetically coupled to the power feed coil 111 and the power receive resonance circuit 210 has a load coil 213 which is electromagnetically coupled to the power receive coil 211.

In the wireless power feeder 100, AC current (e.g., rectangular wave or sinusoidal wave current) is supplied to the power feed resonance circuit 110 and thereby power is fed from the power feed coil 111 to the power receive coil 211 on the basis of a magnetic field resonance effect between the power feed coil 111 and the power receive coil 211. Here, the "magnetic field resonance effect between the power feed coil 111 and the power receive coil 211" means a resonance effect of the power receive resonance circuit 210 based on an AC magnetic field generated by the power feed coil 111. When the AC current is supplied to the power feed resonance circuit 110, AC current flows in the excitation coil 113, AC current flows in the resonance circuit of the power feed coil 111 and the power feed capacitor 112 by an electromagnetic induction effect between the excitation coil 113 and the power feed coil 111, and an AC magnetic field is generated by the power feed coil 111. As a result, the power feed coil 111 and the power receive coil 211 are coupled to each other by the magnetic field and the power feed resonance circuit 210 resonates. Then, AC current flows in the resonance circuit of the power receive coil 211 and the power receive capacitor 212 and AC current flows in the load coil 213 by an electromagnetic induction effect between the power receive coil 211 and the load coil 213. At this moment, when the resonance frequency of the power feed resonance circuit 110 is equal to the resonance frequency of the power receive resonance circuit 210, the power factor of transmission power can be made to be one and it is possible to perform highly efficient power transmission. Alternatively, when the frequency of the AC current supplied to the power feed coil 111 is equal to the resonance frequency of the power receive resonance circuit 210, the power factor of the transmission power can be made to be one and it is possible to perform highly efficient power transmission.

Next, each of the wireless power feeder 100 and the wireless power receiver 200 will be explained in detail.

First, the wireless power feeder 100 is provided with the power feed resonance circuit 110, a power source section 120, a smoothing section 122, a matching circuit 130, power detection sections 140 and 142, a signal processing section 150, a control section 160, a display section 170, a storage section 180, and a communication section 190. Note that, in the present embodiment, the signal processing section 150 and the control section 160 function as the control section described in the claims, and the display section 170 functions as the notification section described in the claims.

The power source section 120 receives input power which has been smoothed by the smoothing section 122 and generates AC power to be supplied to the power feed resonance circuit 110 (i.e., above described AC current). The power source section 120 is configured to be able to change the magnitude of the AC power according to a control signal from the control section 160. Further, the power source section 120 is configured to be able to change the frequency of the AC power according to a control signal from the control section 160.

The matching circuit 130 is provided in the power feed resonance circuit 110. The matching circuit 130 changes its own impedance according to a control signal from the control section 160 to thereby change the impedance of the power feed resonance circuit 110 (i.e., above described resonance frequency of the power feed resonance circuit 110).

Figure 3:
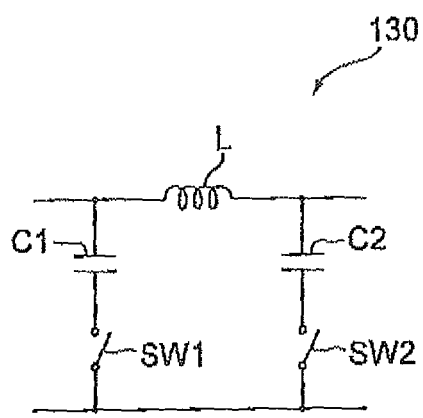
FIG. 3 is a diagram showing a configuration example of a matching circuit shown in FIG. 1.

FIG. 3 shows an example of the matching circuit 130. As shown in FIG. 3, the matching circuit 130 includes an inductor L, capacitors C1 and C2, and switches SW1 and SW2. By the use of the switches SW1 and SW2, various circuit configurations are applied to the matching circuit 130. For example, to the matching circuit 130, a π-type LC filter configuration composed of the inductor L and the capacitors C1 and C2 may be applied or an L-type LC filter configuration composed of the inductor L and the capacitor C1 or the capacitor C2 may be applied.

This matching circuit 130 changes its own impedance by changing at least any of the inductance of the inductor L and the respective capacitances of the capacitors C1 and C2. For example, to the capacitors C1 and C2, it is possible to apply a varactor diode, the capacitance of which can be changed by voltage control. On the other hand, to the inductor L, it is possible to apply a switchable inductor, the inductance of which can be changed by switch selection of the number of inductor stages, for example.

The power detection sections 140 and 142 are provided on the input side and the output side of the power source section 120, respectively. The power detection section 140 detects the input power of the power source section 120. On the other hand, the power detection section 142 detects the output power of the power source section 120, that is, the power supplied to the power feed resonance circuit 110. Note that the power detection section 142 is provided in the power feed resonance circuit 110.

The signal processing section 150 obtains a power transmission efficiency from the wireless power feeder 100 to the wireless power receiver 200. Specifically, the signal processing section 150 calculates a ratio between input power of the power source section 120 detected by the power detection section 140 and input power of the power feed resonance circuit 110 detected by the power detection section 142 as a power transmission efficiency from the wireless power feeder 100 to the wireless power receiver 200. This is based on that the ratio between the input power of the power source section 120 and the input power of the power feed resonance circuit 110 varies depending on the power transmission efficiency from the wireless power feeder 100 to the wireless power receiver 200. Thereby, it is possible to predict the power transmission efficiency even for a state in which the existence of the wireless power receiver 200 is not yet confirmed such as a state when the wireless power feeder 100 is activated.

On the other hand, when the existence of the wireless power receiver 200 can be confirmed and power information of the wireless power receiver 200 can be obtained by the communication section 190 to be described below, the signal processing section 150 may calculate a ratio between power in the wireless power receiver 200 obtained by the communication section 190 and input power of the power source section 120 detected by the power detection section 140, that is, a power transmission efficiency itself from the wireless power feeder 100 to the wireless power receiver 200.

The signal processing section 150 determines a power transmission state from the wireless power feeder 100 to the wireless power receiver 200 using the calculated power transmission efficiency. Specifically, the signal processing section 150 compares the obtained power transmission efficiency with three preliminarily set determination reference values and classifies the power transmission state into four states.

Figure 2:
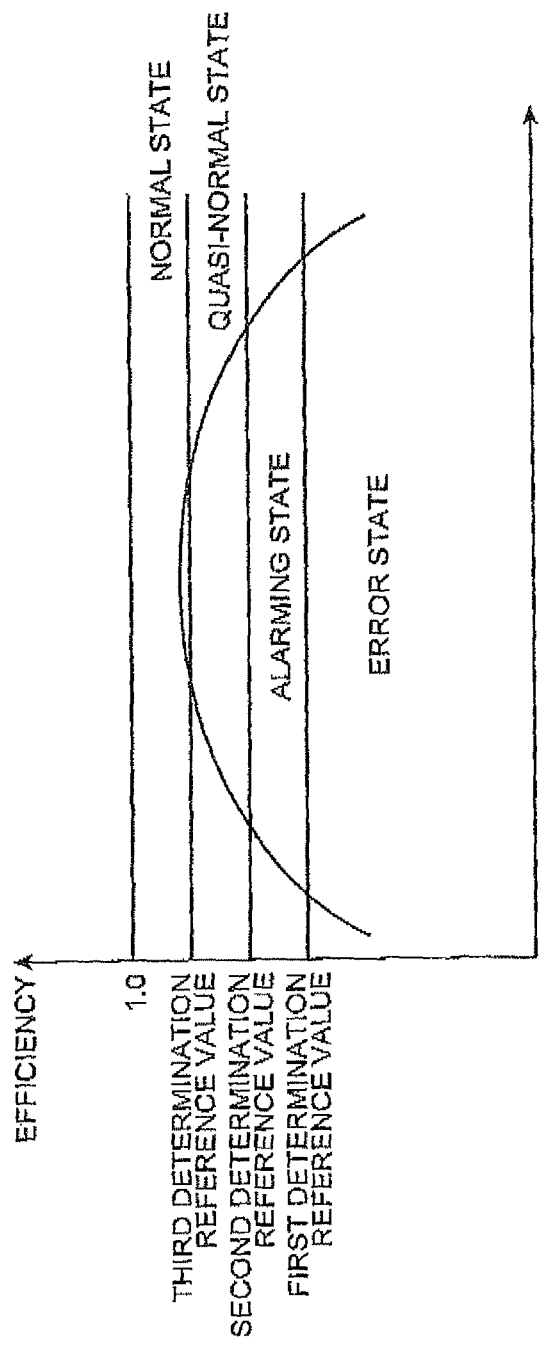
FIG. 2 is a diagram showing a determination reference value for power transmission state determination processing by a signal processing section shown in FIG. 1 and a power transmission state.

FIG. 2 shows the three determination reference values and the four power transmission states. The first determination reference value is a lower limit level of the power transmission efficiency at which power transmission can be permitted and is a power transmission efficiency of 60%, for example. When the power transmission efficiency becomes lower than this first determination reference value, this is determined to be an error state of the power transmission state, that is, a state in which there is a problem that the inherent loss in the wireless power transmission system may increase too much and there is a problem that the unnecessary radiation may exceed the legal standard. Next, a second determination reference value is a lower limit level of the power transmission efficiency at which the power transmission can be permitted almost safely and is a power transmission efficiency of 80%, for example. When the power transmission efficiency becomes lower than this second determination reference value, this is determined to be an alarming state of the power transmission state, that is, a state in which there is a possibility that the error state may be caused by a state change although the power transmission can be permitted. Next, a third determination reference value is a lower limit of the power transmission efficiency at which the power transmission can be performed preferably and is a power transmission efficiency of 90%, for example. When the power transmission efficiency becomes equal to or higher than this third determination reference value, this is determined to be a normal state of the power transmission state, that is, a state in which the power transmission can be performed preferably. On the other hand, when the power transmission efficiency becomes lower than this third determination reference value, this is determined to be a quasi-normal state of the power transmission state, that is, a state in which the power transmission can be permitted to be performed almost safely although the power transmission is not preferable.

The control section 160 controls power supply by the power source section 120 according to the determination result of the signal processing section 150, that is, the power transmission state. Specifically, the control section 160 stops the power supply in the error state. On the other hand, the control section 160 does not limit the supply power in the normal state, limits the supply power in the quasi-normal state more than in the normal state (second power supply state), and further limits the supply power in the alarming state more than in the quasi-normal state (first power supply state).

Further, the control section 160 optimizes the power transmission efficiency by controlling either of the power source section 120 and the matching circuit 130 according to the determination result of the signal processing section 150, that is, the power transmission state. Specifically, the control section 160 changes any of the output power frequency of the power source section 120 (i.e., frequency of AC power supplied to the power feed resonance circuit 110) and the impedance of the matching circuit 130 (i.e., impedance of the power feed resonance circuit 110) so as to maximize the power transmission efficiency in a case except the normal state. The optimization of the power transmission efficiency is performed at a predetermined step in a predetermined frequency variable range, or at a predetermined step in a predetermined impedance variable range.

The control section 160 changes the frequency variable range or the impedance variable range in the optimization of the power transmission efficiency according to the power transmission state. For example, the control section 160 sets the frequency variable range or the impedance variable range to a first, second, and third variable ranges in the error state, alarming state, and quasi-normal state, respectively. The first variable range is a range where the power transmission efficiency can be adjusted from a very bad level to an extent equal to or higher than the first determination reference value and this range is comparatively wide. The first variable range is set in a manner such that the power transmission efficiency becomes equal to or higher than the first determination reference value at one to several points, preferably one to three points, of the predetermined steps in the first variable range. Next, the second variable range is a range where the power transmission efficiency can be adjusted from a level equal to or higher than the first determination reference value to an extent equal to or higher than the second determination reference value and this range is narrower than the first variable range. Similarly, the second variable range is set in a manner such that the power transmission efficiency becomes equal to or higher than the second determination reference value at one to several points, preferably one to three points, of the predetermined steps in the second variable range. Next, the third variable range is a range where the power transmission efficiency can be adjusted from a level equal to or higher than the second determination reference value to an extent equal to or higher than the third determination reference value and this range is narrower than the second variable range. Similarly, the third variable range is set in a manner such that the power transmission efficiency becomes equal to or higher than the third determination reference value at one to several points, preferably one to three points, of the predetermined steps in the third variable range.

The display section 170 displays the determination result by the signal processing section 150, that is, the power transmission state discriminably. It is possible to apply an LED or a display panel to the display section 170, for example. When the display section 170 is configured with the LED, display may be performed by a different color or the different number of lit LEDs for each of the power transmission states. For example, when the power transmission state is displayed by different colors, a red LED, a yellow LED, and a green LED may be lit for the error state, the alarming state, and the quasi-normal or the normal state, respectively.

The storage section 180 preliminarily stores the first to third determination reference values for the determination of the power transmission state from the wireless power feeder 100 to the wireless power receiver 200, a desired power supply amount corresponding to the power transmission state, and the like. Further, the storage section 180 preliminarily stores the frequency variable ranges (first to third variable ranges) for the optimization of the power transmission efficiency, the impedance variable ranges (first to third variable ranges) for the optimization of the power transmission efficiency, and variable step data and the like thereof. Further, the storage section 180 stores the calculated power transmission efficiency information data, the determined power transmission state information data, and the like.

Figure 4:
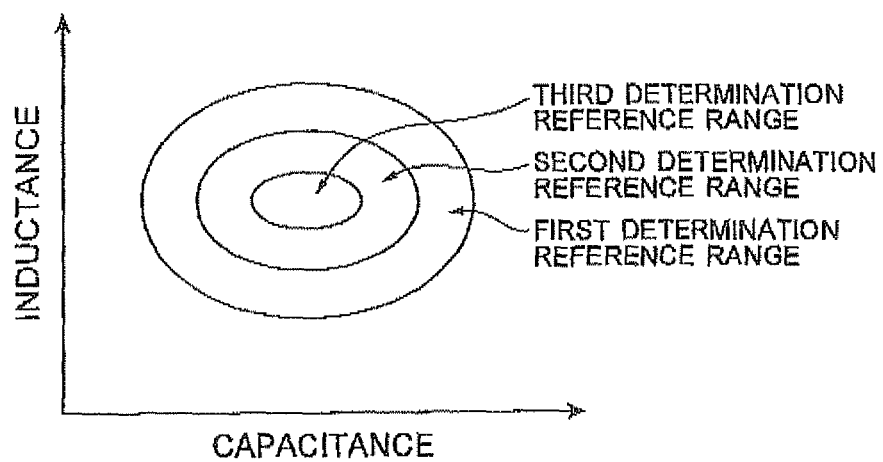
FIG. 4 is a diagram showing a relationship between the inductance and capacitance of the matching circuit shown in FIG. 3, and a power transmission efficiency (i.e., determination reference value).

FIG. 4 shows a relationship of the power transmission efficiency (i.e., each of the first to third determination reference values) with the inductance and capacitance of the matching circuit 130. Impedance variable step data for the optimization of the power transmission efficiency may be combination data of the inductance and the capacitance which are set preliminarily in consideration of FIG. 4.

The communication section 190 performs communication with a communication section 270 in the wireless power receiver 200 and performs information transmission and reception. For example, the communication section 190 obtains power information of the wireless power receiver 200 from the communication section 270.

Next, the wireless power receiver 200 includes the power receive resonance circuit 210, a rectifier section 220, a smoothing section 222, a power detection section 230, a signal processing section 240, a display section 250, a storage section 260, and the communication section 270.

The rectifier section 220 rectifies AC power received by the power receive resonance circuit 210. The rectified power is smoothed by the smoothing section 222 and supplied to a load 300. The power detection section 230 detects the power supplied to the load 300.

The signal processing section 240, the same as the signal processing section 150, calculates a ratio between input power of the power source section 120 obtained by the communication section 270 and input power of the load 300 detected by the power detection section 230 as a power transmission efficiency from the wireless power feeder 100 to the wireless power receiver 200. Then, the signal processing section 240, the same as the signal processing section 150, determines the power transmission state from the wireless power feeder 100 to the wireless power receiver 200 using the calculated power transmission efficiency.

The display section 250 displays the determination result of the signal processing section 240, that is, the power transmission state discriminably, the same as the display section 170.

The storage section 260, the same as the storage section 180, preliminarily stores the first to third determination reference values for the determination of the power transmission state from the wireless power feeder 100 to the wireless power receiver 200, and the like. Further, the storage section 260 stores the calculated power transmission efficiency information data, the determined power transmission state information data, and the like.

The communication section 270 performs communication with the communication section 190 in the wireless power feeder 100 and obtains power information of the wireless power feeder 100.

Next, the operation of the wireless power feeder 100 in the present embodiment will be explained.

Figure 9:
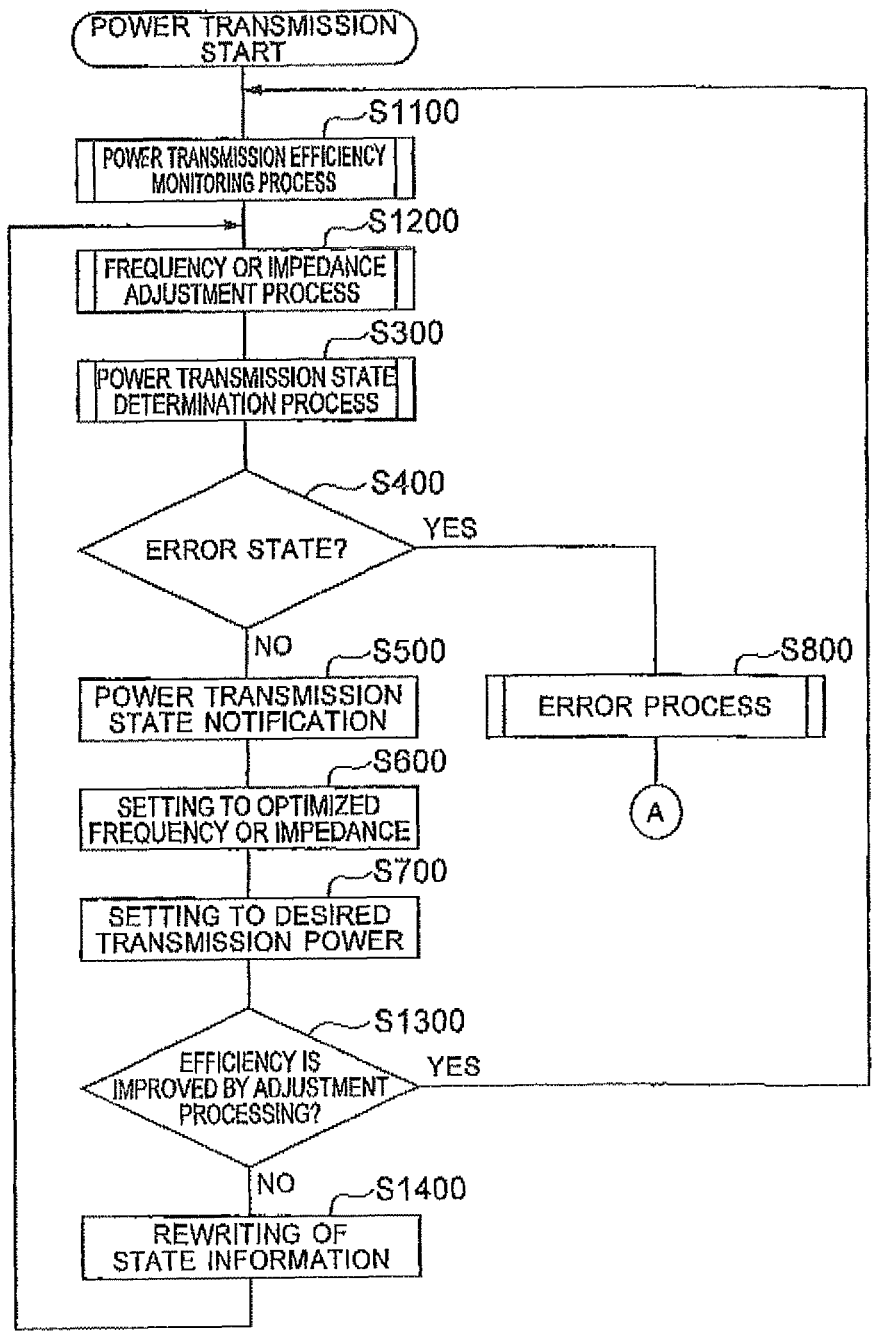
FIG. 9 is a flowchart showing an operation example of a wireless power feeder when power transmission efficiency is optimized during power transmission by means of adjusting only one of a drive frequency and an impedance of a power feed resonance circuit.
Figure 10:
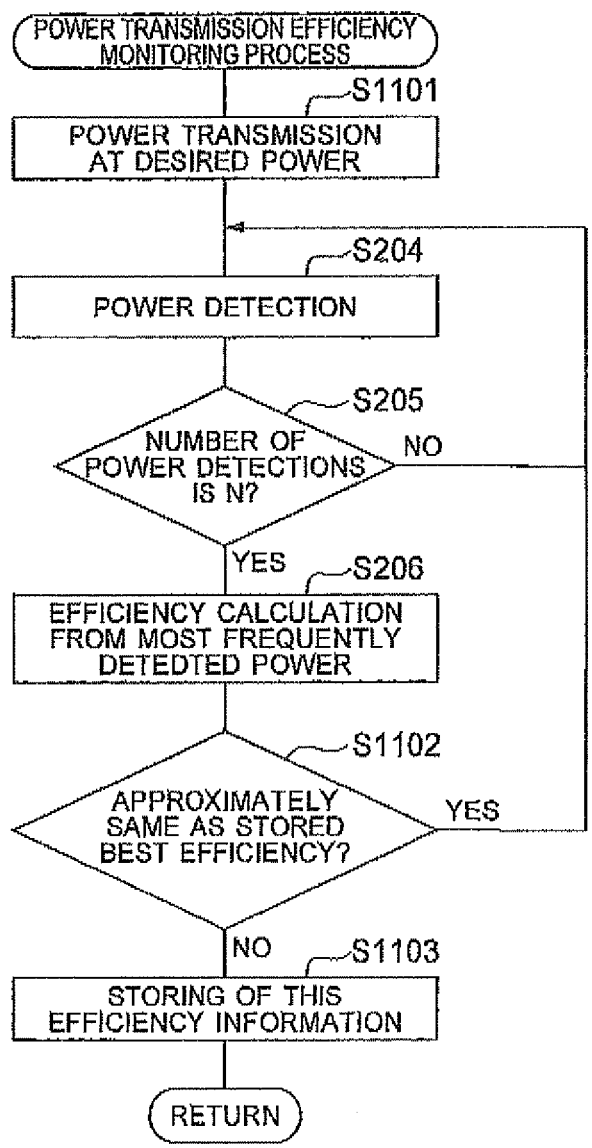
FIG. 10 is a flowchart showing an example of a power transmission efficiency monitoring process shown in FIG. 9.
Figure 11:
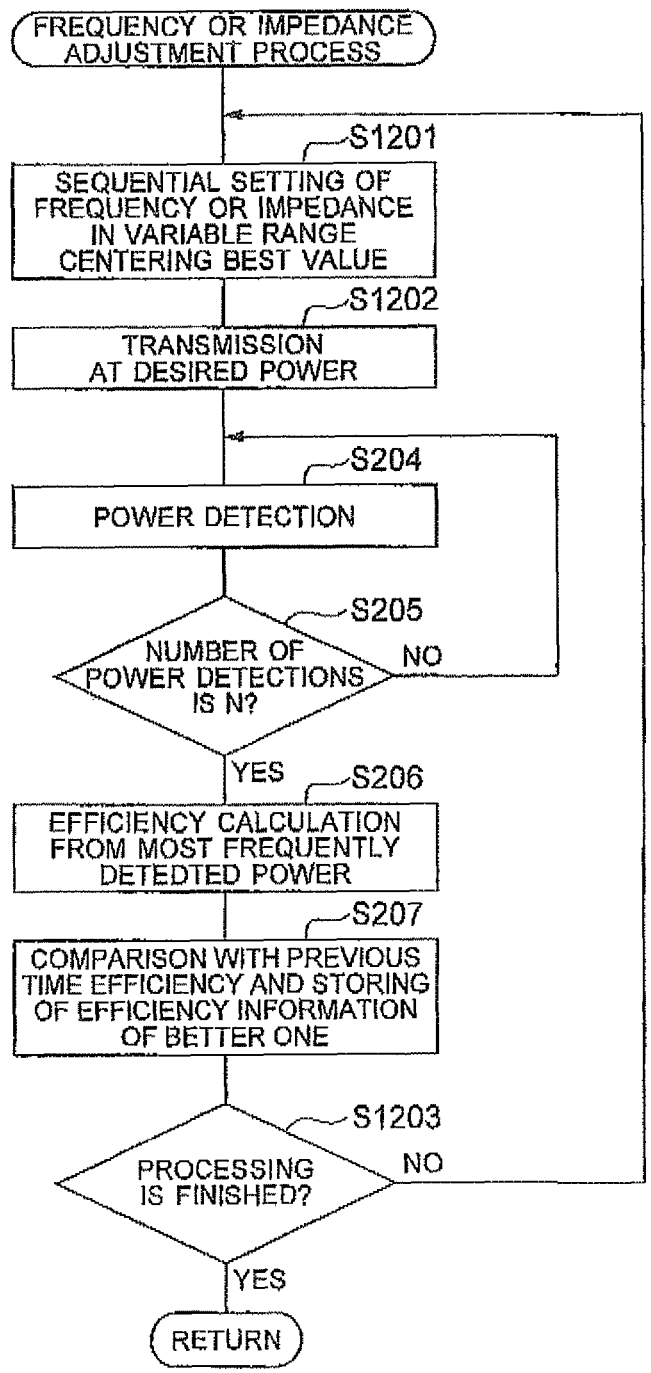
FIG. 11 is a flowchart showing an example of a frequency or impedance adjustment process shown in FIG. 9.

1. Case of Optimizing the Power Transmission Efficiency by Adjusting Only One of the Drive Frequency and the Impedance of the Power Feed Resonance Circuit FIGS. 5 to 8 are flowcharts showing an operation example of the wireless power feeder when the power transmission efficiency is optimized in activation by means of adjusting only one of the drive frequency and the impedance of the power feed resonance circuit. FIGS. 9 to 11 are flowcharts showing an operation example of the wireless power feeder when the power transmission efficiency is optimized during power transmission by means of adjusting only one of the drive frequency and the impedance of the power feed resonance circuit.

1.1. In the Activation of the Wireless Power Feeder

Figure 5:
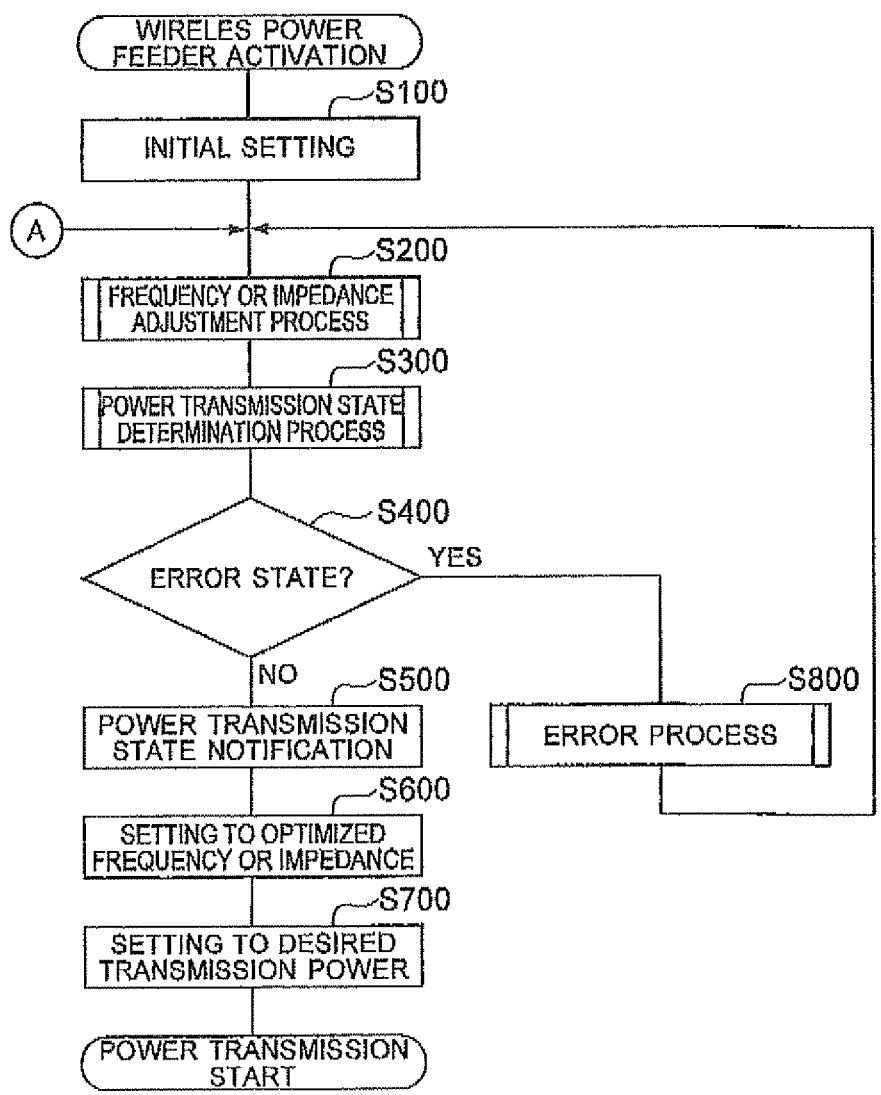
FIG. 5 is a flowchart showing an operation example of a wireless power feeder when power transmission efficiency is optimized in activation by means of adjusting only one of the drive frequency and the impedance of a power feed resonance circuit.

As shown in FIG. 5, in the activation of the wireless power feeder 100, first the drive frequency (i.e., output power frequency of the power source section 120) f0 of the power feed resonance circuit 110 and the impedance of the power feed resonance circuit 110 (i.e., inductance L0 and capacitance C0 of the matching circuit 130) are set to respective initial values (initialized) (Step S100).

Next, the power transmission efficiency from the wireless power feeder 100 to the wireless power receiver 200 is optimized. Specifically, the signal processing section 150 and the control section 160 adjust the drive frequency of the power feed resonance circuit 110 (i.e., output power frequency of the power source section 120) or the impedance of the power feed resonance circuit 110 (i.e., combination of the inductance and capacitance of the matching circuit 130) so as to maximize the power transmission efficiency (Step S200).

Next, the signal processing section 150 determines the power transmission state after the optimization (Step S300). If the power transmission state is a state except the error state (Step S400), the display section 170 displays the power transmission state (Step S500), and also the control section 160 sets the drive frequency or the impedance of the power feed resonance circuit 110 to the optimized drive frequency or impedance (Step S600) and sets transmission power to a desired power corresponding to the power transmission state (Step S700) to start power transmission. On the other hand, when the power transmission state is the error state (Step S400), the control section 160 performs error process (Step S800) and returns to Step S200.

Next, the frequency or impedance adjustment process S200, the power transmission state determination process S300, and the error process S800 will be explained.

(Frequency or Impedance Adjustment Process)

Figure 6:
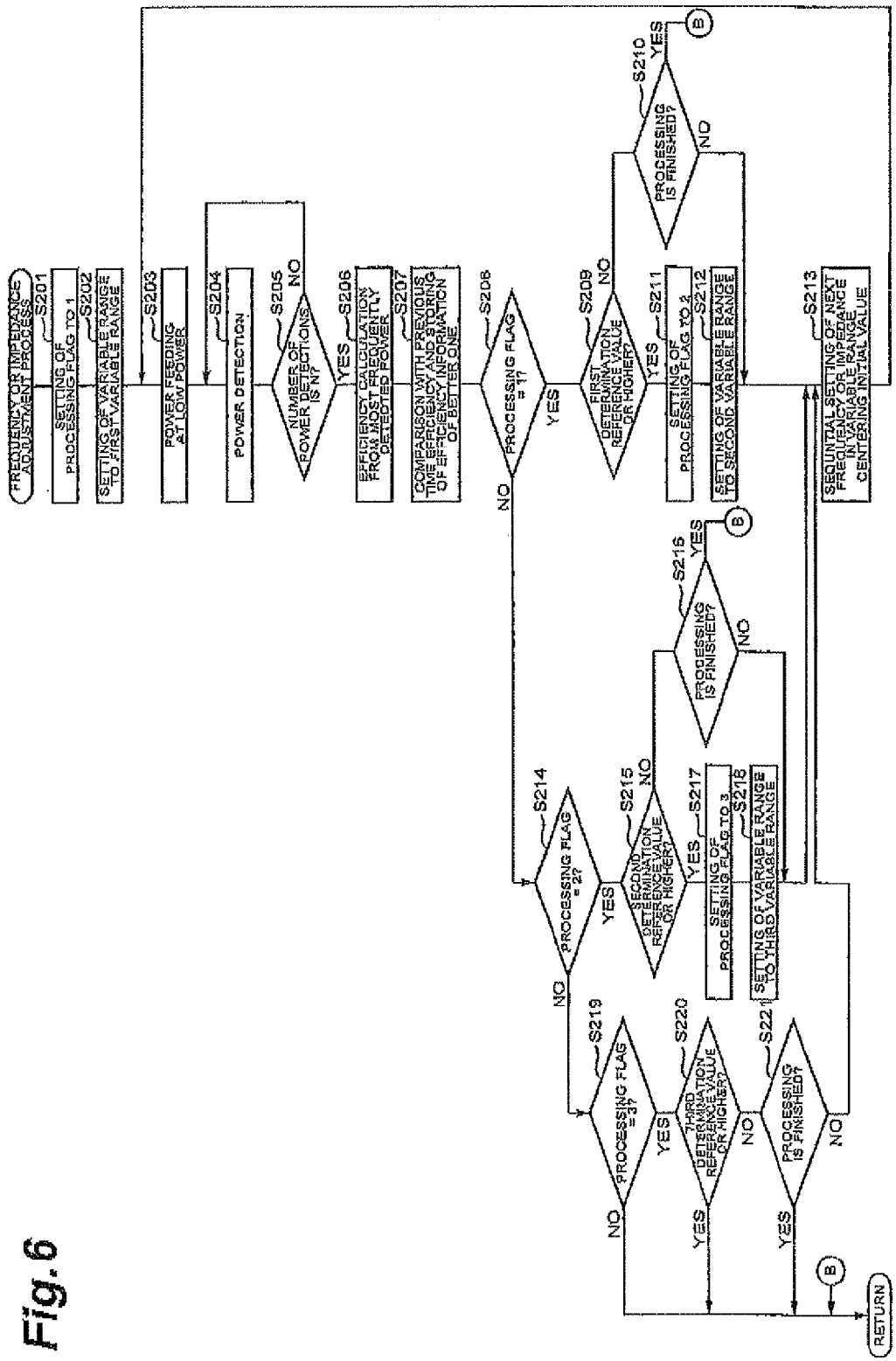
FIG. 6 is a flowchart showing an example of a frequency or impedance adjustment process shown in FIG. 5.

In the frequency or impedance adjustment process S200, as shown in FIG. 6, first the signal processing section 150 and the control section 160 set a processing flag to one (Step S201), set the frequency or impedance variable range to the comparatively wide first variable range (Step S202), start power feed in a sufficiently small power compared to that of the normal state (Step S203), and perform power detection (Step S204). In this manner, by performing the frequency or impedance adjustment process at a low power, it is possible to perform EMC countermeasures and power source protection also in the optimization of the power transmission efficiency.

After this power detection has been performed in predetermined N times (Step S205), an efficiency is calculated from the most frequently detected power value (Step S206). That is, an efficiency corresponding to an average value in the plural measurements is calculated. After that, the calculated efficiency is compared with the previous time efficiency stored in the storage section 180 and efficiency information of the better one is stored in the storage section 180 (Step S207) In this manner, by obtaining the efficiency from the plural power detections, it is possible to suppress erroneous detection of the power transmission efficiency due to noise.

After that, it is determined whether the processing flag is one or not (Step S208). If the processing flag is one, it is determined whether or not the stored efficiency information is equal to or higher than the first determination reference value (Step S209). If the stored efficiency information is lower than the first determination reference value, it is determined whether the frequency or impedance adjustment process is to be stopped or not (Step S210), and, if the number of transitions to this step is equal to or larger than a predetermined number, for example, it is determined that the power transmission efficiency is declined by some sort of cause, and the frequency or impedance adjustment process is stopped. If the frequency or impedance adjustment process is not to be stopped, a frequency or impedance of the next variable step is sequentially set in the frequency variable range or impedance variable range centering the initial value (first variable range set in Step S202) (Step S213), and the process returns to Step S203 to repeat the frequency or impedance adjustment process.

In Step 209, if the stored efficiency information is equal to or higher than the first determination reference value, the processing flag is set to two (Step S211), the frequency or impedance variable range is set to the second range which is narrower than the first range (Step S212), and the process goes to Step S214 via Step 213 and Steps 203 to S208.

In Step S214, it is determined whether the processing flag is two or not. If the processing flag is two, it is determined whether or not the stored efficiency information is equal to or higher than the second determination reference value (Step S215). If the stored efficiency information is lower than the second determination reference value, it is determined whether the frequency or impedance adjustment process is to be stopped or not (Step S216), and, if the number of transitions to this step is equal to or larger than a predetermined number, for example, it is determined that the power transmission efficiency is declined by some sort of cause and the frequency or impedance adjustment process is stopped. If the frequency or impedance adjustment process is not to be stopped, the process goes to Step S213 to repeat the frequency or impedance adjustment process.

In Step S215, if the stored efficiency information is equal to or higher than the second determination reference value, the processing flag is set to three (Step S217), the frequency or impedance variable range is set to the third range which is narrower than the second range (Step S218), and the process goes to Step S219 via Steps 213, Steps 203 to 208, and Step 214.

In Step S219, it is determined whether the processing flag is three or not. If the processing flag is three, it is determined whether or not the stored efficiency information is equal to or higher than the third determination reference value (Step S220). If the stored efficiency information is lower than the third determination reference value, it is determined whether the frequency or impedance adjustment process is to be stopped or not (Step S221), and, if the number of transitions to this step is equal to or larger than a predetermined number, for example, it is determined that the power transmission efficiency is declined by some sort of cause and the frequency or impedance adjustment process is stopped. If the frequency or impedance adjustment process is not to be stopped, the process goes to Step 213 to repeat the frequency or impedance adjustment process.

Further, in Step S220, if the stored efficiency information is equal to or higher than the third determination reference value, the frequency or impedance adjustment process is also stopped. Further, in Step S219, if the processing flag is not three, the frequency or impedance adjustment process is also stopped.

(Power Transmission State Determination Process)

Figure 7:
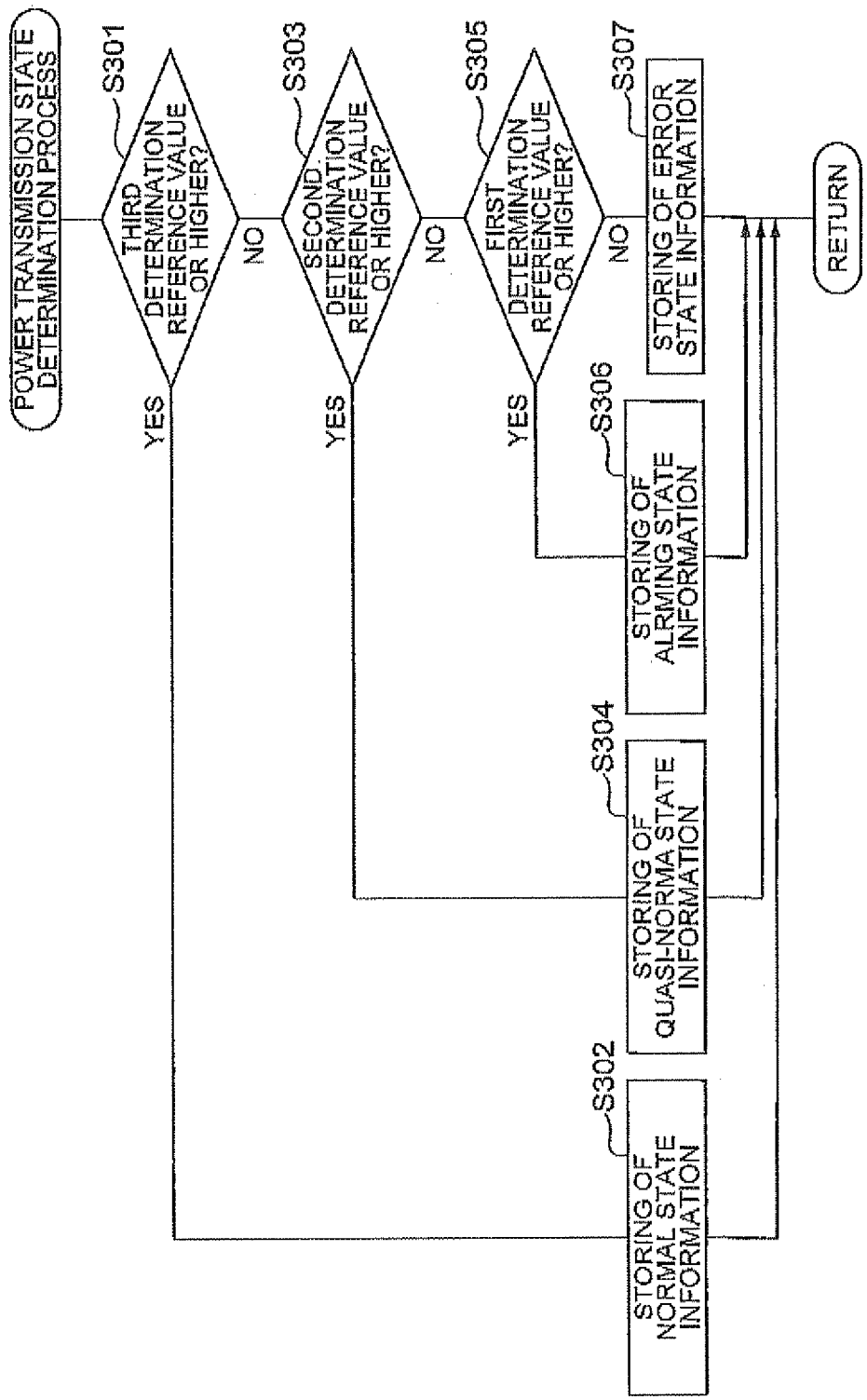
FIG. 7 is a flowchart showing an example of a power transmission state determination process shown in FIG. 5.

Next, in the power transmission state determination process S300, as shown in FIG. 7, first the signal processing section 150 determines whether or not the optimized power transmission efficiency is equal to or higher than the third determination reference value (Step S301). If the optimized power transmission efficiency is equal to or higher than the third determination reference value, it is determined that the power transmission is in the normal state and this normal state information is stored in the storage section 180 (step S302).

On the other hand, if the optimized power transmission efficiency is lower than the third determination reference value, it is determined whether or not the optimized power transmission efficiency is equal to or higher than the second determination reference value (Step S303). If the optimized power transmission efficiency is equal to or higher than the second determination reference value, it is determined that this is the quasi-normal state in which the power transmission can be permitted to be performed almost safely although the power transmission is not preferable, and this quasi-normal state information is stored in the storage section 180 (Step S304).

On the other hand, if the optimized power transmission efficiency is lower than the second determination reference value, it is determined whether or not the optimized power transmission efficiency is equal to or higher than the first determination reference value (Step S305). If the optimized power transmission efficiency is equal to or higher than the first determination reference value, it is determined that this is the alarming state in which there is a possibility of the error state due to a state change although the power transmission can be permitted, and this alarming state information is stored in the storage section 180 (Step S306).

On the other hand, if the optimized power transmission efficiency is lower than the first determination reference value, it is determined that this is the error state in which there is a risk that power feeder may be broken due to loss increase and there is a risk that the unnecessary radiation may exceed the legal standard, and this error state information is stored in the storage section 180 (Step S307).

The power transmission state is displayed on the display section 170 in Step S500 of FIG. 5 by the use of these sets of power transmission state information stored in the storage section 180.

Note that, in Step S400, the process does not go to the processing of Step S500 and the succeeding steps when the power transmission state is the alarming state and goes to the processing of Step S500 and the succeeding steps after the power transmission state has become the quasi-normal state. That is, even when the power transmission efficiency increases to the first determination reference vale or more, the power supply to the power feed resonance circuit 110 is not started, and, when the power transmission efficiency increases to the second determination reference value or more, the power supply to the power feed resonance circuit 110 is started. On the other hand, even when the power transmission efficiency declines to less than the second determination reference value, the power supply to the power feed resonance circuit 110 is not stopped, and, when the power transmission efficiency declines to less than the first determination reference value, the power supply to the power feed resonance circuit 110 is stopped. By this hysteresis operation characteristic, it is possible to prevent the ON-OFF chattering of the power transmission operation.

(Error Process)

Figure 8:
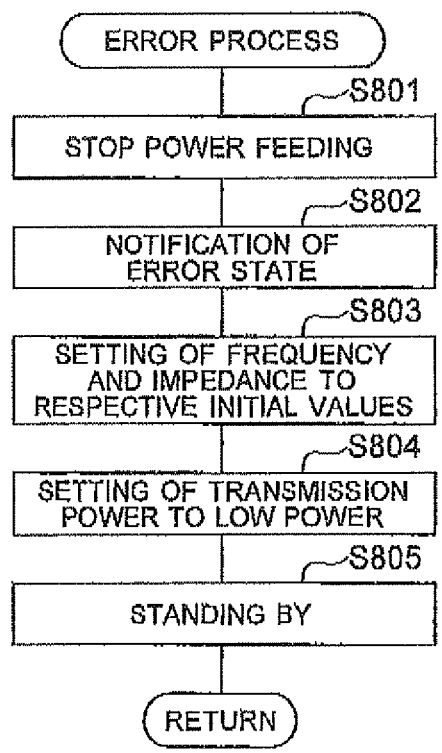
FIG. 8 is a flowchart showing an example of error process shown in FIG. 5.

Next, in the error process S800, as shown in FIG. 8, first the control section 160 stops the power supply by the power source section 120 to the power feed resonance circuit 110 (Step S801), and displays the error state on the display section 170 (Step S802). After that, the drive frequency and the impedance of the power feed resonance circuit 110 are reset to the respective initial values (Step S803), the transmission power is reset to a low power (Step S804), and the process stands by (step S805).

1.2. In the Power Transmission of the Wireless Power Feeder

Next, processing after the start of the power transmission will be explained. As shown in FIG. 9, the signal processing section 150 and the control section 160 repeat the monitoring of the power transmission efficiency periodically, and, when the power transmission efficiency changes, store the efficiency information (Step S1100) and perform the optimization of the power transmission efficiency by performing the frequency or impedance adjustment process (Step S1200). Then, the power transmission state after the optimization is determined (Step S300), and, if the power transmission state is a state except the error state (Step S400), the power transmission state is displayed on the display section 170 (Step S500) and also the drive frequency or impedance of the power feed resonance circuit 110 is set to the optimized frequency or impedance (Step S600), the transmission power is set to a desired power corresponding to the power transmission state (Step S700), and it is determined whether the efficiency is improved or not by this frequency or impedance adjustment process (Step S1300). If the efficiency is improved, the process returns to the power transmission efficiency monitoring process of Step S1100. On the other hand, if the efficiency is not improved in Step S1300, the efficiency information stored in Step S1100 is rewritten to the efficiency information after the adjustment by the frequency or impedance adjustment process (Step S1400), and the frequency or impedance adjustment process of Step S1200 is continued.

Note that, in this processing after the start of the power transmission, if the power transmission state is the error state in Step S400, the error process is performed (Step S800) and the process goes to the frequency or impedance adjustment process in the activation of Step S200 shown in FIG. 5.

Next, the power transmission efficiency monitoring process S1100 and the frequency or impedance adjustment process S1200 will be explained.

(Power Transmission Efficiency Monitoring Process)

In the power transmission efficiency monitoring process S1100, as shown in FIG. 10, first the signal processing section 150 and the control section 160 continue the power transmission at the desired power (Step S1101) and performs the power detection (Step S204). After this power detection has been performed in the preliminarily determined N times (Step S205), an efficiency is calculated from the most frequently detected power value (Step S206). After that, it is determined whether the calculated efficiency is approximately the same or not as the best efficiency stored in the storage section 180 (Step S1102), and this efficiency information is stored in the storage section 180 if the power transmission efficiency changes (Step S1103). Note that, if the power transmission efficiency does not change, the process returns to Step S204 to repeat the power detection.

(Frequency or Impedance Adjustment Process)

Next, the frequency or impedance adjustment process S1200 will be explained. As shown in FIG. 11, first the signal processing section 150 and the control section 160 set a frequency or impedance of the next variable step sequentially in the frequency variable range or impedance variable range centering the best value at this time point (Step S1201), continue the power transmission at the desired power (Step S1202), and performs the power detection (Step S204). After this power detection has been performed in the predetermined N times (Step S205), an efficiency is calculated from the most frequently detected power value (Step S206). After that, the calculated efficiency is compared with the previous time efficiency stored in the storage section 180 and the efficiency information of the better one is stored in the storage section 180 (Step S207). After that, it is determined whether the frequency or impedance adjustment process is to be stopped or not (Step S1203), and, if the number of the transitions to this step is larger than a predetermined number, for example, the frequency or impedance adjustment process is stopped. If the frequency or impedance adjustment process is not to be stopped, the process returns to Step S1201 to repeat the frequency or impedance adjustment process.

2. Case of Optimizing the Power Transmission Efficiency by Means of Adjusting Both of the Drive Frequency and the Impedance of the Power Feed Resonance Circuit FIG. 12 is a flowchart showing an operation example of the wireless power feeder when the power transmission efficiency is optimized in the activation by means of adjusting both of the drive frequency and the impedance of the power feed resonance circuit, and FIG. 13 is a flowchart showing an operation example of the wireless power feeder when the power transmission efficiency is optimized during power transmission by means of adjusting both of the drive frequency and the impedance of the power feed resonance circuit.

2.1. In the Activation of the Wireless Power Feeder

Figure 12:
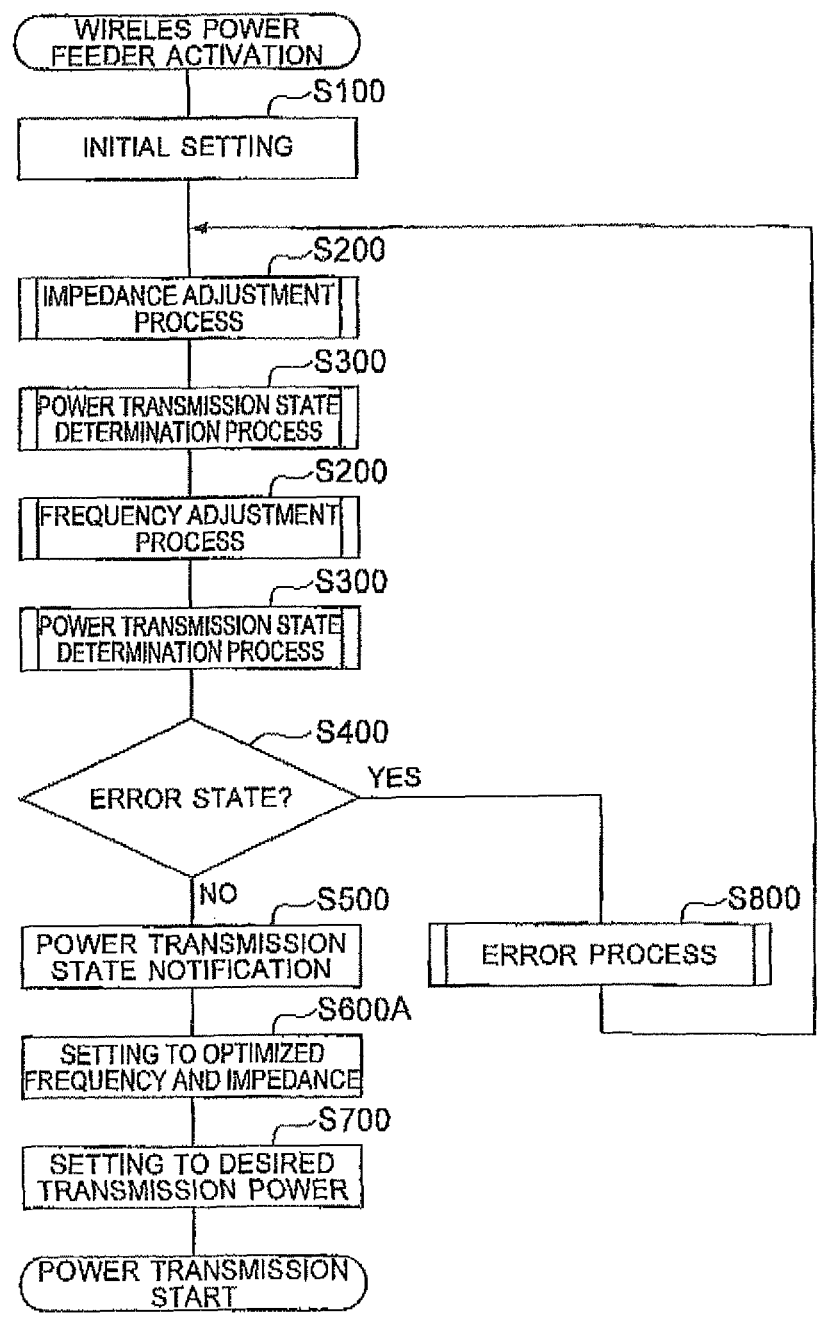
FIG. 12 is a flowchart showing an operation example of a wireless power feeder when power transmission efficiency is optimized in activation by means of adjusting both of a drive frequency and an impedance of a power feed resonance circuit.
Figure 13:
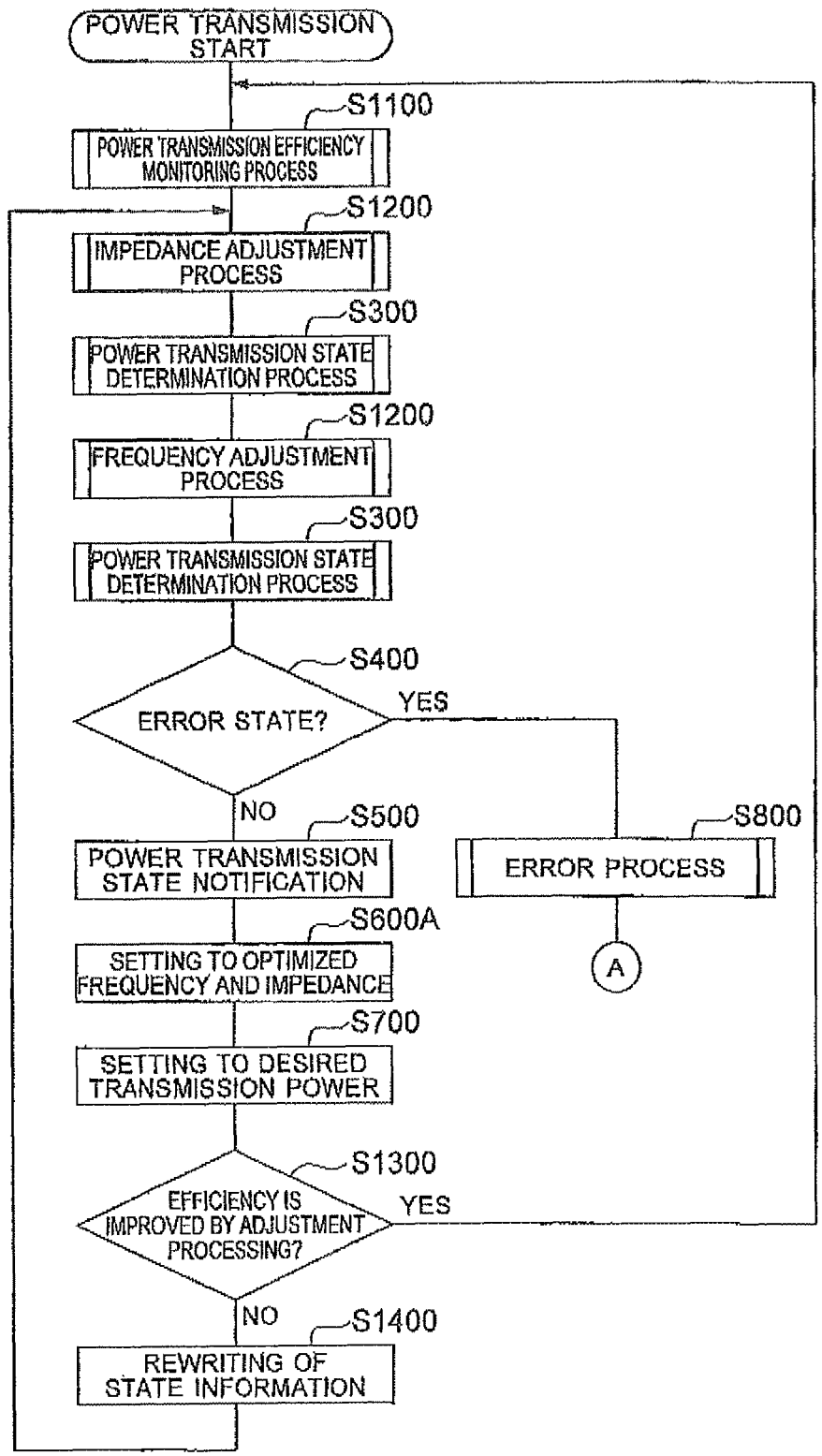
FIG. 13 is a flowchart showing an operation example of a wireless power feeder when power transmission efficiency is optimized during power transmission by means of adjusting both of a drive frequency and an impedance of a power feed resonance circuit.

As shown in FIG. 12, when the power transmission efficiency is optimized in the activation of the wireless power feeder 100 by means of adjusting both of the drive frequency and the impedance of the power feed resonance circuit 110, first the signal processing section 150 and the control section 160 perform the adjustment of the impedance of the power feed resonance circuit 110 (i.e., combination of the inductance and capacitance in the matching circuit 130) (Step S200) and the determination of the power transmission state (Step S300), and, in a state in which the impedance after the adjustment has been set, perform the adjustment of the drive frequency of the power feed resonance circuit 110 (i.e., output power frequency of the power source section 120) (Step S200) and the determination of the power transmission state (Step S300).

Note that, in Step S600A, the drive frequency and impedance of the power feed resonance circuit 110 are set to the optimized frequency and impedance, respectively.

2.2 In the Power Transmission of the Wireless Power Feeder

Similarly, as shown in FIG. 13, when the power transmission efficiency is optimized after the start of the power transmission by means of adjusting both of the drive frequency and the impedance of the power feed resonance circuit 110, first the signal processing section 150 and the control section 160 perform the adjustment of the impedance of the power feed resonance circuit 110 (i.e., combination of the inductance and capacitance in the matching circuit 130) (Step S1200) and the determination of the power transmission state (Step S300), and, in a state in which the impedance after the adjustment has been set, perform the adjustment of the drive frequency of the power feed resonance circuit 110 (i.e., output power frequency of the power source section 120) (Step S1200) and the determination of the power transmission state (Step S300).

Incidentally, in the wireless power transmission system 1, if the power transmission is continued when the power transmission efficiency declines due to the variation in a quality of components constituting each of the power feed resonance circuit 110 and the power receive resonance circuit 210, due to the change of the relative distance between the power feed coil 111 and the power receive coil 211, due to the positional deviation of the power feed coil 111 or the power receive coil 211, due to the intrusion of foreign material between the power feed coil 111 and the power receive coil 211, or the like, the inherent loss in the wireless power transmission system and the unnecessary radiation increase and there arises a problem that some sort of failure may occur due to these hazardous factors.

According to the wireless power feeder 100 and the wireless transmission system 1 of the present embodiment, the signal processing section 150 and the control section 160 stop the power supply to the power feed resonance circuit 110 by the power source section 120 in the error state in which the power transmission efficiency is lower than the first determination reference value, and thereby it is possible to avoid the failure occurrence due to the decline of the power transmission efficiency.

Further, according to the wireless power feeder 100 and the wireless power transmission system 1 of the present embodiment, the control section 160 limits the feed power in the quasi-normal state, in which the power transmission efficiency is lower than the third determination reference value, more than in the normal state in which the power transmission efficiency is equal to or higher than the third determination reference value, and further limits the feed power in the alarming state, in which the power transmission efficiency is lower than the second determination reference value, more than in the quasi-normal state, and thereby it is possible to continue the power transmission while suppressing the inherent loss in the wireless power transmission system and the unnecessary radiation even when the power transmission efficiency declines (improve the robustness controllability).

Further, according to the wireless power feeder 100 and the wireless power transmission system 1 of the present embodiment, the control section 160 performs the optimization of the power transmission efficiency by adjusting either of the drive frequency and the impedance of power feed resonance circuit 110 according to the power transmission state, and thereby it is possible to suppress the decline of the power transmission efficiency. For example, it is possible to perform the adjustment so as to cause the power transmission efficiency to reach a level within a predetermined determination reference range in a case in which the wireless power receiver 200 is located at an inappropriate position when the wireless power feeder 100 is activated, a case in which the existence of the wireless power receiver 200 cannot be confirmed, or the like.

Further, according to the wireless power feeder 100 and the wireless power transmission system 1 of the present embodiment, the frequency variable range or the impedance variable range is changed according to the power transmission state when the power transmission efficiency is optimized, and specifically the variable range is narrowed in the alarming state more than in the error state and narrowed in the quasi-normal state more than in the alarming state, and thereby it is possible to shorten the processing time for the power transmission efficiency optimization.

Further, according to the wireless power feeder 100 and the wireless power transmission system 1 of the present embodiment, the display section 170 displays the power transmission state, and thereby a user can recognize the power transmission state and can perform positional adjustment between the wireless power feeder and the wireless power receiver, removal of the foreign material between the wireless power feeder and the wireless power receiver, and the like, for example, so as to obtain a preferable operation state.

Note that the present invention can be modified variously without being limited to the above described present embodiment. While, in the present embodiment, the four power transmission states are determined by the use of the three determination reference values, the present invention is not limited to this example. For example, three power transmission states may be determined by the use of at least two determination reference values.

Further, in the present embodiment, among the three determination reference values, the second and the third determination reference values except the first determination reference value for avoiding the failure occurrence may be configured in a manner such that the setting thereof can be optionally changed by a user. As a result, it is possible to improve user's convenience according to a usage situation and to realize user friendliness.

Further, in the present embodiment, the first determination reference value may be changed according to the magnitude of the AC current supplied to the power feed resonance circuit 110. For example, in a low power transmission operation, the first determination reference value for avoiding the failure occurrence can be set to be also small. When the first determination reference value is set to be small in the low power transmission operation, the transmission distance can be extended and freedom of the facing angle between the coils can be increased.

Further, while, in the present embodiment, the power supply is stopped when the power transmission state is the error state, the present invention is not limited to this example. For example, the power supply may be operated intermittently.

Further, while, in the present embodiment, a power ratio is calculated as a power transmission efficiency, the present invention is not limited to this example. For example, a current ratio may be calculated as a power transmission efficiency.

Further, while, in the present embodiment, the power detection section 142 is provided in the power feed resonance circuit 110, the present invention is not limited to this example. For example, the power detection section 142 may be provided between the power source section 120 and the matching circuit 130.

Further, while, in the present embodiment, the matching circuit 130 is provided in the power feed resonance circuit 110, the present invention is not limited to this example. For example, the matching circuit may not be provided when only the frequency adjustment processing is performed.

Figure 14:
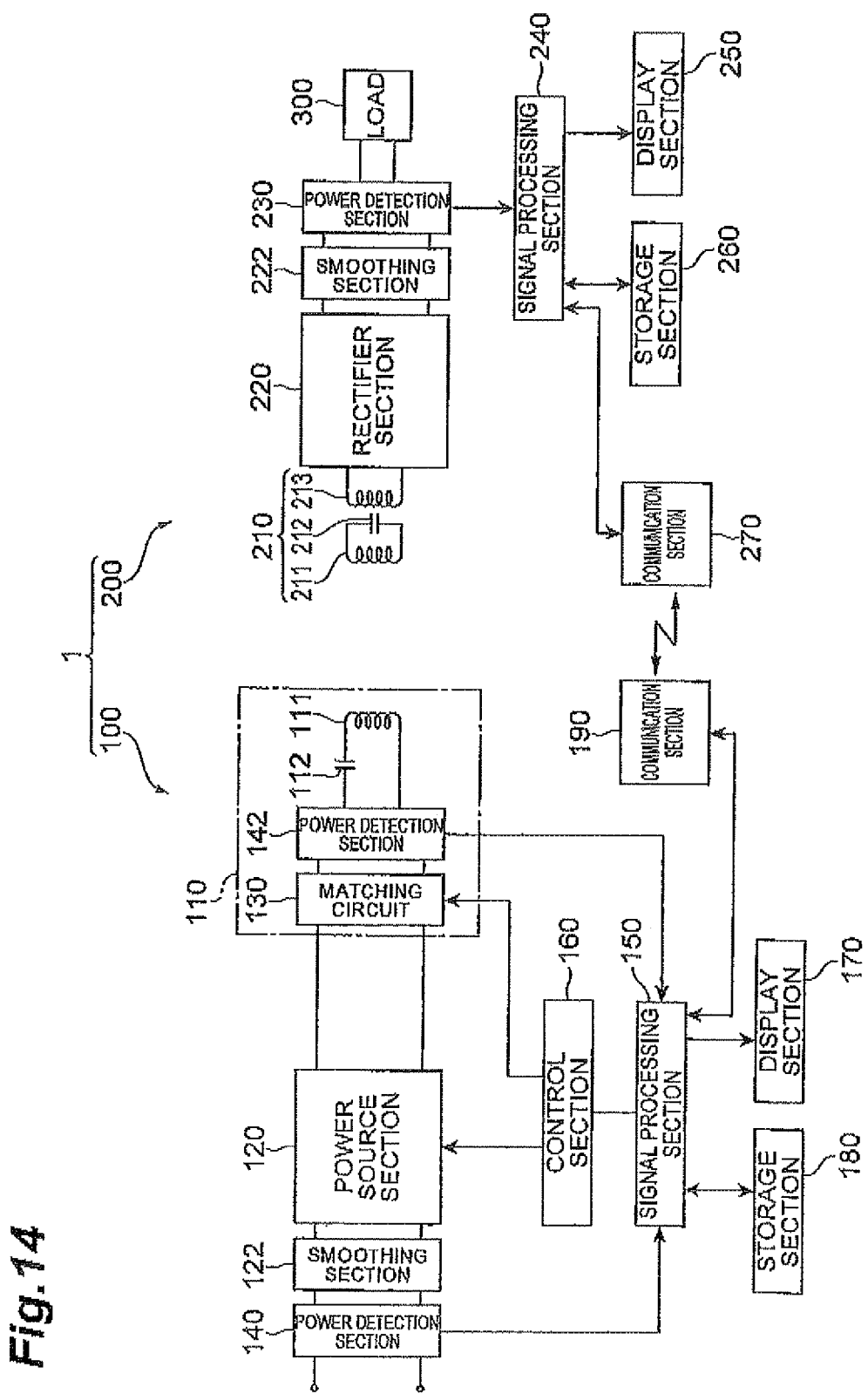
FIG. 14 is a circuit block diagram showing a configuration example of a wireless power transmission system and a wireless power feeder in a variation example of the present invention.

Further, while, in the present embodiment, the power feed resonance circuit 110 in the wireless power feeder 100 supplies AC current to a resonance circuit of the power feed coil 111 and the power feed capacitor 112 via the excitation coil 113, the present invention is not limited to this example. For example, as shown in FIG. 14, the power feed resonance circuit 110 may supply the AC current to the power feed coil 111 and the power feed capacitor 112 directly without via the excitation coil.

Figure 15:
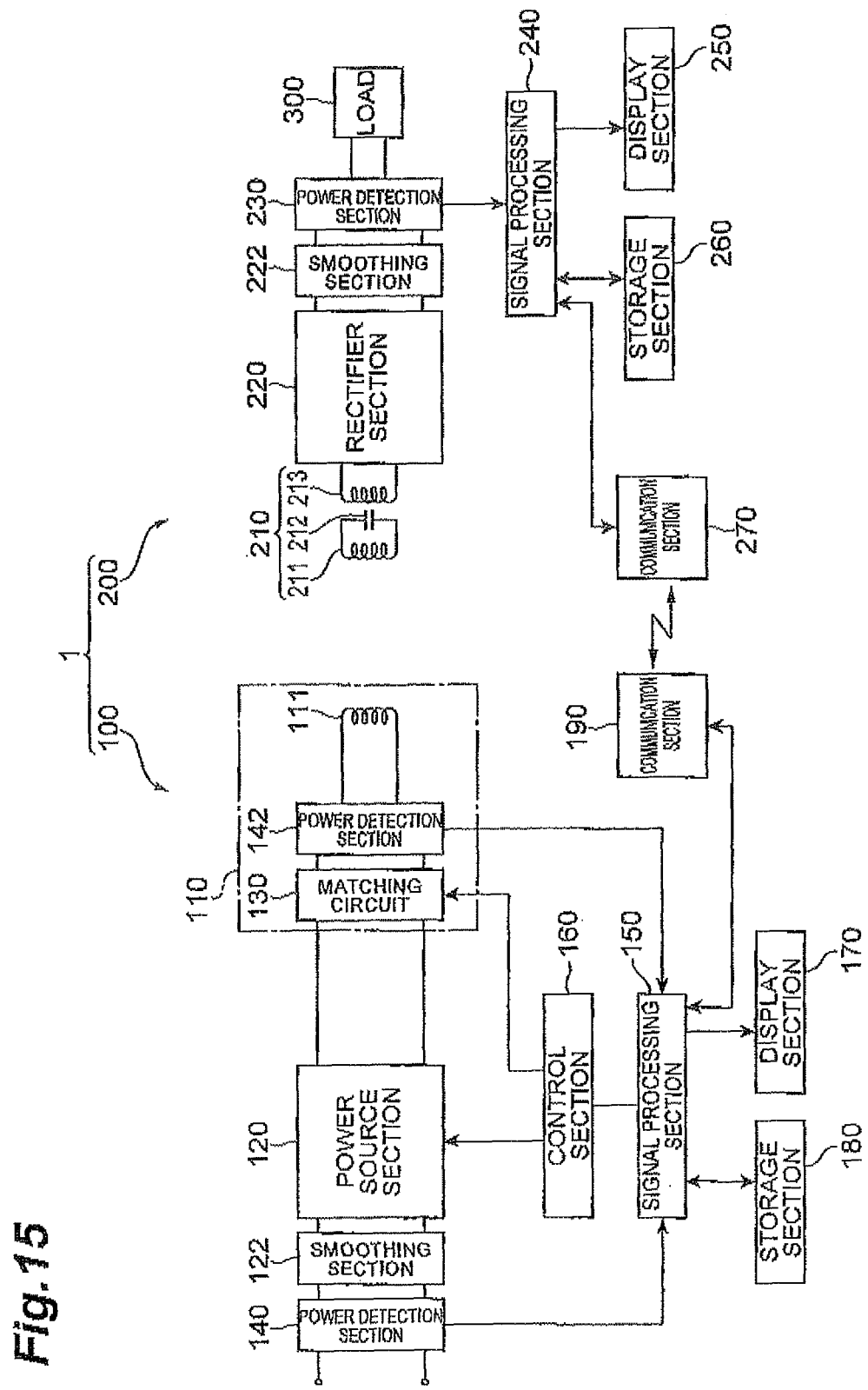
FIG. 15 is a circuit block diagram showing a configuration example of a wireless power transmission system and a wireless power feeder in a variation example of the present invention.

Further, for example, as shown in FIG. 15, in the present embodiment, the power feed coil 111 in the wireless power feeder 100 may not substantially constitute a resonance circuit, and perform power feed from the power feed coil 111 to the power receive coil 211 on the basis of a magnetic field resonance effect between the power feed coil 111 and the power receive coil 211. Here, "does not substantially constitute a resonance circuit" means that it does not form a resonance circuit of which the resonance frequency is the resonance frequency of the power receive resonance circuit 210, but does not exclude the fact that the power feed coil 111 may resonate incidentally with any of the circuit elements. For example, "does not substantially constitute a resonance circuit" means that a capacitor is not provided in series or in parallel with the power feed coil 111, in order to form a resonance circuit having a resonance frequency which is the resonance frequency of the power receive resonance circuit 210.

In the wireless power feeder 100, the stronger the magnetic field coupling between the power feed coil 111 and the power receive coil 211, the greater the effect on the resonance frequency of the power receive resonance circuit 210. More specifically, the resonance frequency of the power receive resonance circuit 211 in a state where the power feed coil 111 and the power receive coil 211 are in sufficiently close proximity to enable magnetic field coupling therebetween diverges from the resonance frequency of the power receive resonance circuit 210 alone, in a state where the power feed coil 111 and the power receive coil 211 are sufficiently distanced from each other to enable magnetic field coupling therebetween to be ignored. By supplying an AC current of a frequency close to the resonance frequency of the power receive resonance circuit 210, to the power feed coil 111, it is possible to achieve wireless power feed based on a magnetic field resonance mechanism.

Further, in the present embodiment, a wireless power transmission system is described in which at least the wireless power receiver comprises a power receive resonance circuit 210 constituted by a power receive coil 211 and a power receive capacitor 212, and power transmission is performed from the power feed coil 111 to the power receive coil 211 on the basis of a magnetic field resonance effect between the power feed coil 111 and the power receive coil 211, but the characteristic features of the present invention can also be applied to a wireless power transmission system in which the wireless power feeder and the wireless power receiver do not comprise resonance circuits and power transmission is performed from the power feed coil 111 to the power receive coil 211 on the basis of an electromagnetic induction effect between the power feed coil 111 and the power receive coil 211. In this case, the frequency of the AC current of the power feed coil 111 should be matched to the frequency of the current flowing in the power receive coil 211, instead of the frequency of the resonance current of the power receive resonance circuit 210.

Further, while, in the present embodiment, the display section 170 is illustrated as the notification section, an alarming section such as a speaker may be used as the notification section. In this case, it is possible to perform notification of the power transmission state by a kind or a magnitude of alarming.

Further, the features of the present invention can be applied not only to the power transmission but also to signal transmission. For example, the wireless power transmission system of the present invention can be applied also when an analog signal or a digital signal is transmitted by a non-contact method utilizing a magnetic field resonance effect.

Note that the present invention can be applied to a field of non-contact power feed in which power feed to a heavy load (high power) such as a TV is performed by a non-contact method and a field of non-contact charge/discharge in which charge/discharge of a rechargeable battery is performed by a non-contact method.

Note that, while, in the present specification, the element used for the magnetic field resonance effect is called a "coil", this element sometimes called a "transmitter", an "antenna", or the like depending on a related technical field.

While, hereinabove, the principle of the present invention has been explained in the preferable embodiments with reference to the drawings, it is recognized by those skilled in the art that the present invention can be changed in disposition and in detail without departing from such a principle. The present invention is not limited to a specific configuration disclosed in the embodiments. Accordingly, the right is claimed for all the modifications and variations based on the range and the spirit of the claims.

What is claimed is:

1. A wireless power feeder which performs power feed by a non-contact method to a wireless power receiver having a power receive coil, the wireless power feeder comprising:

a power feed coil to perform power feed from the power feed coil to the power receive coil on the basis of a magnetic coupling between the power feed coil and the power receive coil a power source section supplying AC power to the power feed coil; and a control section calculating a power transmission efficiency from the power feed coil to the power receive coil to control the power source section according to the power transmission efficiency, wherein the control section controls the power source section so that the power supply to the power feed coil is in a stopped state or in an intermittent supply state when the power transmission efficiency is lower than a first determination reference value, controls the power source section so that the power supply to the power feed coil is in a first power supply state when the power transmission efficiency is equal to or higher than the first determination reference value and lower than a second determination reference value, the second determination reference value being larger than the first determination reference value, and controls the power source section so that the power supply to the power feed coil is in a second power supply state when the power transmission efficiency is equal to or higher than the second determination reference value.

2. The wireless power feeder according to claim 1, wherein the AC power supplied to the power feed coil in the first power supply state is smaller than the AC power supplied to the power feed coil in the second power supply state.

3. The wireless power feeder according to claim 1, wherein the control section controls the power source section so as not to start the power supply to the power feed coil even when the power transmission efficiency increases to the first determination reference value or more and so as to start the power supply to the power feed coil when the power transmission efficiency increases to the second determination reference value or more, and controls the power source section so as not to stop the power supply to the power feed coil even when the power transmission efficiency declines to less the second determination reference value and so as to stop the power supply to the power feed coil when the power transmission efficiency declines to less than the first determination reference value.

4. The wireless power feeder according to claim 1, wherein the control section adjusts the power transmission efficiency by changing a frequency of the AC power supplied to the power feed coil.

5. The wireless power feeder according to claim 1, wherein the control section adjusts the power transmission efficiency by changing impedance of the power feed coil.

6. The wireless power feeder according to claim 4, wherein the control section controls the power source section so that a frequency variable range of the AC power supplied to the power feed coil in the second power supply state is narrower than a frequency variable range of the AC power supplied to the power feed coil in the first power supply state.

7. The wireless power feeder according to claim 5, wherein the control section controls the power supply section so that an impedance variable range of the power feed coil in the second power supply state is narrower than an impedance variable range of the power feed coil in the first power supply state.

8. The wireless power feeder according to claim 1, further comprising
a notification section notifying discriminably that the power supply to the power feed coil is in the stopped state or the intermittent supply state, in the first power supply state, or in the second power supply state.

9. The wireless power feeder according to claim 1, wherein Setting of the second determination reference value can be changed.

10. The wireless power feeder according to claim 1, wherein
the first determination reference value can be changed according to the AC power supplied to the power feed coil.

11. The wireless power feeder according to claim 1, wherein
the control section calculates a ratio between input power of the power source section and AC power supplied to the power feed coil or a ratio between input current of the power source section and AC current supplied to the power feed coil as a power transmission efficiency from the power feed coil to the power receive coil.

12. The wireless power feeder according to claim 1, which performs power feed by a non-contact method to the wireless power receiver having a power receive resonance circuit including the power receive coil and a power receive capacitor,
the wireless power feeder further comprising:
a power feed resonance circuit including the power feed coil and a power feed capacitor to perform power feed from the power feed coil to the power receive coil on the basis of a magnetic field resonance effect between the power feed coil and the power receive coil.

13. The wireless power feeder according to claim 12, wherein
the control section adjusts the power transmission efficiency by changing impedance of the power feed resonance circuit.

14. The wireless power feeder according to claim 13, wherein
the control section controls the power supply section so that an impedance variable range of the power feed resonance circuit in the second power supply state is narrower than an impedance variable range of the power feed resonance circuit in the first power supply state.

15. The wireless power feeder according to claim 1, which performs power feed by a non-contact method to the wireless power receiver having a power receive resonance circuit including the power receive coil and a power receive capacitor, wherein
the power feed coil does not substantially constitute a resonance circuit, and perform power feed from the power feed coil to the power receive coil on the basis of a magnetic field resonance effect between the power feed coil and the power receive coil.

16. A wireless power transmission system which performs power transmission by a non-contact method between the wireless power feeder according to claim 1 and a wireless power receiver having a power receive coil, wherein
the power transmission is performed from the power feed coil in the wireless power feeder to the power receive coil in the wireless power receiver on the basis of a magnetic coupling between the power feed coil and the power receive coil.

17. A wireless power transmission system which performs power transmission by a non-contact method between the wireless power feeder according to claim 12 and a wireless power receiver having a power receive resonance circuit including a power receive coil and a power receive capacitor, wherein
the power transmission is performed from the power feed coil in the wireless power feeder to the power receive coil in the wireless power receiver on the basis of a magnetic field resonance effect between the power feed coil and the power receive coil.

18. A wireless power transmission system which performs power transmission by a non-contact method between the wireless power feeder according to claim 15 and a wireless power receiver having a power receive resonance circuit including a power receive coil and a power receive capacitor, wherein
the power transmission is performed from the power feed coil in the wireless power feeder to the power receive coil in the wireless power receiver on the basis of a magnetic field resonance effect between the power feed coil and the power receive coil.

* * * * *